(12) United States Patent
Jones

(10) Patent No.: US 6,471,849 B1
(45) Date of Patent: Oct. 29, 2002

(54) PROCESS FOR THE RECOVERY OF ZINC FROM A ZINC SULPHIDE ORE OR CONCENTRATE

(75) Inventor: David L. Jones, Delta (CA)

(73) Assignee: Cominco Engineering Services Ltd., Vancouver (CA)

( * ) Notice: Subject to any disclaimer, the term of this patent is extended or adjusted under 35 U.S.C. 154(b) by 0 days.

(21) Appl. No.: 09/659,098

(22) Filed: Sep. 11, 2000

(51) Int. Cl.⁷ .................. C22B 19/00; C22B 15/00; C25C 1/16
(52) U.S. Cl. .................. 205/605; 423/99; 423/109; 423/24
(58) Field of Search .................. 423/99, 109, 24; 205/605, 607, 608

(56) References Cited

U.S. PATENT DOCUMENTS

| | | | | |
|---|---|---|---|---|
| 4,004,991 A | | 1/1977 | Veltman et al. | |
| 4,330,379 A | * | 5/1982 | Verbaan | |
| 4,832,925 A | * | 5/1989 | Weir et al. | |
| 5,770,170 A | * | 6/1998 | Collins et al. | |
| 5,858,315 A | * | 1/1999 | Van Put et al. | |
| 5,869,012 A | * | 2/1999 | Jones | |
| 5,902,474 A | * | 5/1999 | Jones | |

* cited by examiner

*Primary Examiner*—Steven Bos
(74) *Attorney, Agent, or Firm*—Elbie R. de Kock

(57) ABSTRACT

A processs for the recovery of zinc from a zinc sulphide ore or concentrate comprises the steps of subjecting the concentrate to pressure leaching with an acidic solution containing at least about 15 g/L iron in solution to produce a zinc solution and a solid leach residue containing iron. The zinc solution is subjected to zinc solvent extraction to produce a raffinate and a pregnant zinc solution. A method of removing ion from an iron bearing raffinate is also provided which comprises pressure leaching a zinc sulphide ore with the iron bearing raffinate to produce a solid leach residue containing iron and a zinc solution.

11 Claims, 3 Drawing Sheets

PROCESS FOR THE RECOVERY OF ZINC FROM A ZINC SULPHIDE ORE OR CONCENTRATE

FIELD OF THE INVENTION

This invention relates to a process for the pressure leaching of zinc in a two stage leaching process.

BACKGROUND OF THE INVENTION

In mining operations, such as copper mining involving sulphide ores, waste ore or low grade ore is separated from the higher grade ore which is treated for the extraction of metal, such as copper, therefrom.

The low grade or waste ore is also treated for copper recovery, e.g. by leaching the ore in the waste dump (dump leach) to produce a copper solution, from which the copper is extracted to produce a raffinate.

Due to the high pyrite content of the waste ore and natural oxidation of this ore by atmospheric oxygen, aided by natural bacteria, the iron concentration of the raffinate resulting from the leaching of this ore builds up over the many years of operation.

Attempts have been made to remove the iron from the solution, without success, resulting in large amounts of acidic iron containing solution being accumulated.

It is accordingly an object of the present invention to provide a method whereby the iron can be removed from these solutions.

U.S. Pat. No. 4,004,991 describes a process for the pressure leaching of zinc and iron containing mineral sulphides in dilute $H_2SO_4$ solution. The pressure leaching is carried out in a two-stage countercurrent process in which finely divided sulphides are leached in a first leaching stage with solution from the second leaching stage to produce a first stage leach solution containing a high zinc concentration and low iron and $H_2SO_4$ concentrations. The first stage leach solution is subjected to purification treatment and then treated for zinc recovery by electrowinning. The residue from the first stage is pressure leached in the second stage with return electrolyte from the electrowinning process.

It is another object of this invention to provide an alternative zinc extraction process in which the iron bearing raffinate from waste dump leach can be used.

SUMMARY OF THE INVENTION

According to the invention there is provided a process for the recovery of zinc from a zinc sulphide ore or concentrate, comprising steps of subjecting the concentrate to pressure leaching with an acidic leach solution containing at least about 15 g/L iron in solution to produce a zinc solution and a solid leach residue containing iron; subjecting the zinc solution to zinc solvent extraction to produce a raffinate and a pregnant zinc solution; and subjecting the pregnant zinc solution to electrowinning to recover zinc and producing a resultant spent electrolyte.

The acidic leach solution may contain 15 g/L or more iron and about 15 to 20 g/L free acid or about 50 g/L sulphate total, combined sulphates of iron and sulphuric acid.

Also according to the invention there is provided a method of removing iron from an iron bearing raffinate comprising the steps of pressure leaching a zinc sulphide ore with said iron bearing raffinate to produce a solid leach residue containing iron and a zinc solution.

The pressure leaching is preferably carried out in two stages countercurrently, comprising a first stage leach to produce the zinc solution and an intermediate residue; a second stage leach wherein the intermediate residue is leached with said acidic leach solution containing at least 15 g/L iron to produce said leach residue containing iron and a partly exhausted iron containing leach solution; and effecting the first stage leach with said partly exhausted ion containing leach solution.

Preferably, the acid leach solution contains at least about 30 g/L iron.

Further objects and advantages of the invention will become apparent from the description of a preferred embodiment of the invention below.

BRIEF DESCRIPTION OF THE DRAWINGS

The invention is now described by way of example with reference to the accompanying drawings, in which.

DETAILED DESCRIPTION OF PREFERRED EMBODIMENT

Figure 1:
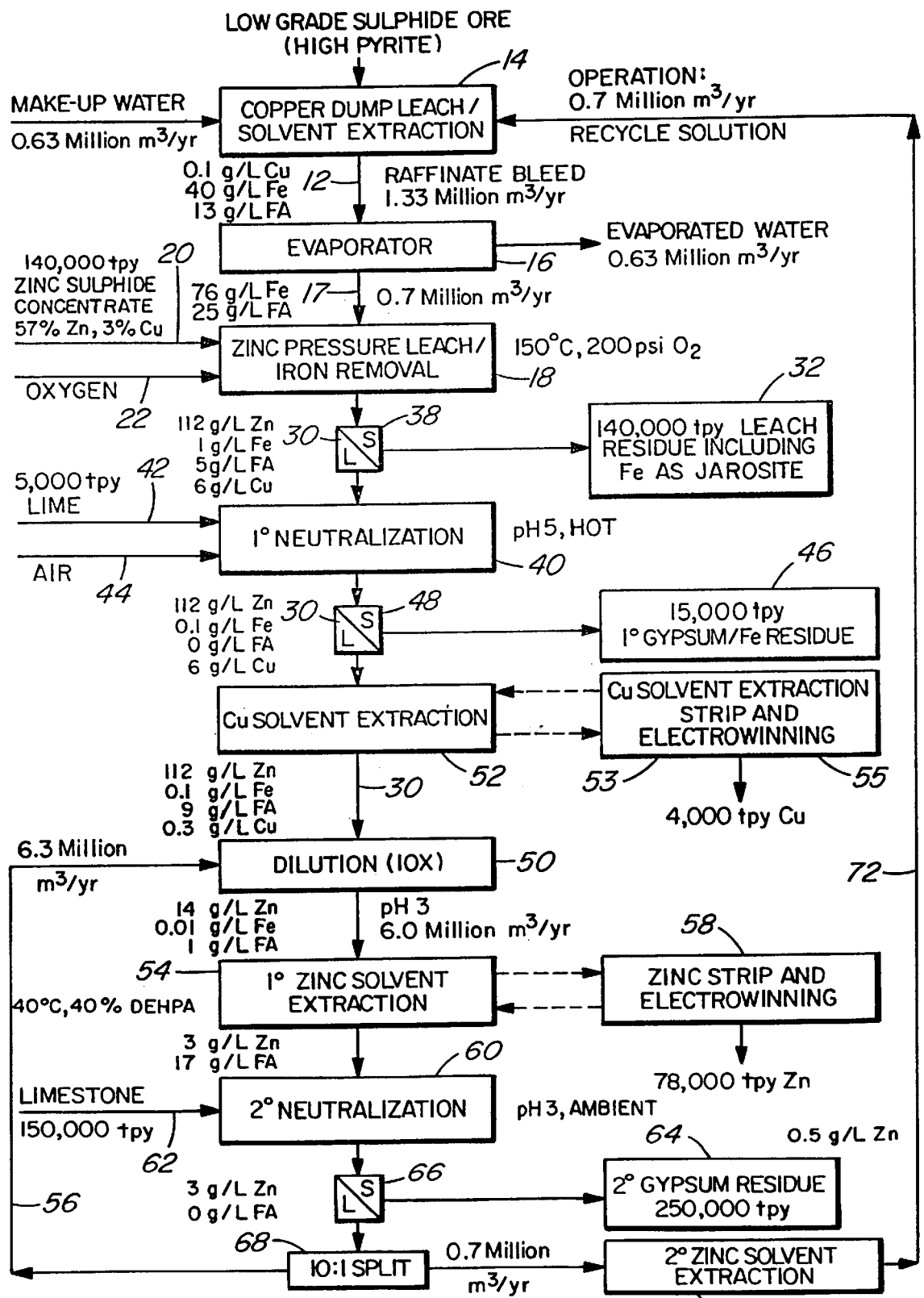
FIG. 1 is a flow diagram illustrating a zinc sulphide process using iron bearing raffinate from a dump leach.

With reference to FIG. 1 showing the overall process, raffinate 12, resulting from the acid leaching of a low grade sulphide ore in a mine waste dump, e.g. copper sulphide ore, as indicated at 14, initially contains about 40 g/L Fe, 13 g/L free acid and a small amount of copper, e.g. 0.1 g/L. (Acid concentration is determined by standard acid-base titration to pH 4.)

To improve the efficiency of the process, the raffinate 12 is first evaporated, as indicated at 16, to about 2/3 of its volume to produce a more concentrated iron and acid bearing feed solution, e.g. 76 g/L Fe and 25 g/L free acid. The more concentrated raffinate 12 is then fed to a zinc pressure leach step 18, as indicated by arrow 17. A zinc sulphide concentrate containing, in this example, about 57% Zn and 3% Cu is also fed to the pressure leaching 18, as indicated by arrow 20, as well as oxygen, as indicated by arrow 22.

Figure 2:
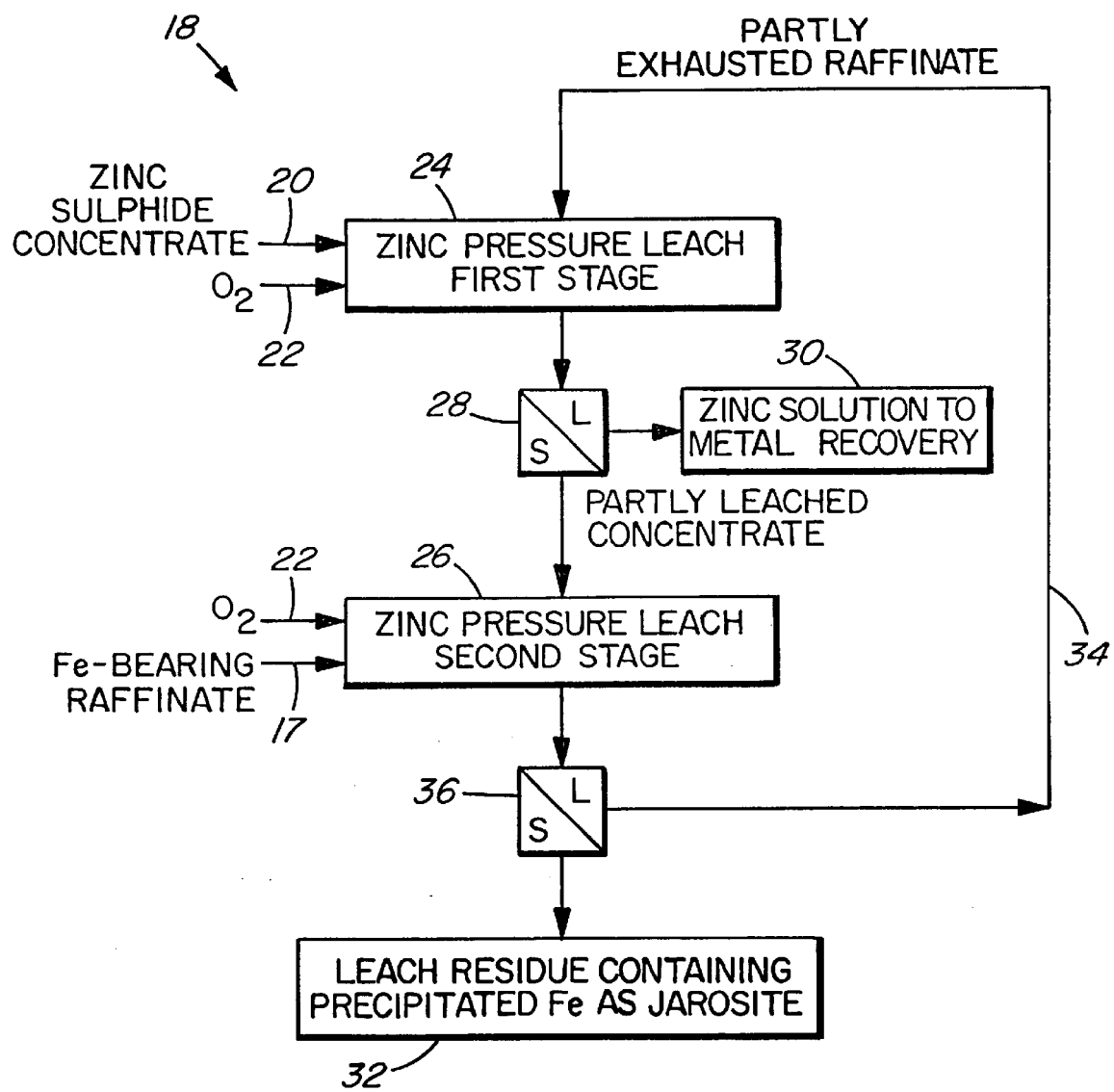
FIG. 2 is a flow sheet showing details of a two-stage zinc pressure leach of the process of FIG. 1.

The pressure leaching 18 is carried out in two stages countercurrently, as shown in FIG. 2, i.e. a first stage 24 and a second stage 26. The process involves two autoclaves in countercurrent fashion with a liquid/solid separation 28 in between so as to produce a pregnant zinc solution 30, with neglible acid and iron in solution, from the first stage 24 and a fully leached residue 32 from the second stage 26.

As indicated by arrow 20 in FIG. 2, the zinc concentrate is fed to the first stage pressure leach 24, along with the oxygen (arrow 22), and is leached using partly exhausted Fe raffinate from the second stage 26, as indicated by arrow 34. As indicated, there is a liquid/solid separation 36 after the second stage 26 to separate the partly exhausted raffinate from the residue 32.

The product slurry from the first stage 24 is filtered (liquid/solid separation 28) to separate the pregnant zinc solution 30 from an as yet partly reacted (leached) concentrate (filter cake) which is then subjected to the second stage leach 26.

The iron containing raffinate 12 from the waste dump referred to above, is fed to the second stage leach 26, as indicated by the arrow 17, where the leaching of the partly leached concentrate from the first stage 24 is completed.

The resultant slurry from the second stage 26 is filtered (liquid/solid separation 36) and the filtrate now partly exhausted in that the iron and acid contents are at reduced levels, is recycled to the first stage 24 (arrow 34 as referred to above).

The residue 32 is the leach residue containing all the precipitated iron as a jarosite solid.

The weight of the residue 32 (filter cake) is approximately the same as the original feed concentrate, due to the precipitated iron replacing the zinc that has been leached out. Residual zinc in the leach residue is low, typically less than 1%, corresponding to more than 98% zinc recovery to solution.

In addition to the jarosite, the other main byproduct of the zinc pressure leaching process is elemental sulphur. Most of the sulphur in the original feed concentrate is converted to the elemental form, due to the conditions in the pressure leach process 18, with minimal (<10% typical) oxidation of sulphide to sulphate.

Lignosol or calcium lignosulphonate may be used as catalyst in small concentrations, e.g. 0.05 g/L up to 0.5 g/L, to counteract liquid sulphur in the pressure oxidation 18 from wetting unreacted sulphide particles and hampering complete reaction.

The pressure oxidation 18 is carried out at about 150° C., 100 g/L to 300 g/L, preferably 200 g/L solids, at 200 psig pressure with 85% oxygen in the gas phase (dry basis) with one hour retention in each of the stages 24 and 26. The soluble iron present in the leaching solution act as a catalyst during the zinc pressure oxidation 18. Ferric sulphate reacts with ZnS (solid) to solibilize the zinc and is reduced to ferrous sulphate. The ferrous iron is then oxidized back to the ferric state.

After the pressure oxidation 18, the slurry is flashed down to atmospheric pressure (not shown). The steam resulting from the flashdown may be used to pre-heat the feed solution to achieve the desired temperature in the pressure oxidation 18, especially if a low percentage solids feed is used. This may be beneficial to allow a lower iron concentration in the feed solution.

The further treatment of the pregnant zinc solution 30 from the pressure oxidation 18 is now described with reference to FIG. 1. It should be noted that the single liquid/solid separation indicated at 38 showing the residue 32 being separated from the pregnant solution 30, is a simplification since the pressure oxidation 18 is shown as only one stage in FIG. 1.

The pregnant solution 30, now containing about 110 g/L Zn, 0.1 to 1 g/L Fe, 1 to 10 g/L free acid and 6 g/L Cu, is first subjected to neutralization 40 with lime, or other neutralization agent, (arrow 42) and optionally in the presence of air (arrow 44) to remove excess acid and iron. This produces a gypsum/iron residue 46 which is separated from the pregnant solution 30, now containing about 110 g/L Zn, 0.1 g/L Fe, 0 g/L free acid and 6 g/L Cu, by means of a liquid/solid separation 48.

It is to be noted that the values of the concentrations of the various components of the liquids during the process are given by way of example only. In particular, the percentage solids in the feed to the pressure oxidation 18 can be varied to produce lower or higher zinc and copper concentrations in the product solution.

In order to render zinc solvent extraction more efficient, the pregnant solution 30 from the neutralization 40 is diluted as indicated at 50. However, if desired, a copper solvent extraction 52 may be carried out between the neutralization and dilution steps 40 and 50 to recover the small amount of copper present in the original waste ore from which the iron raffinate 12 is obtained.

Figure 3:
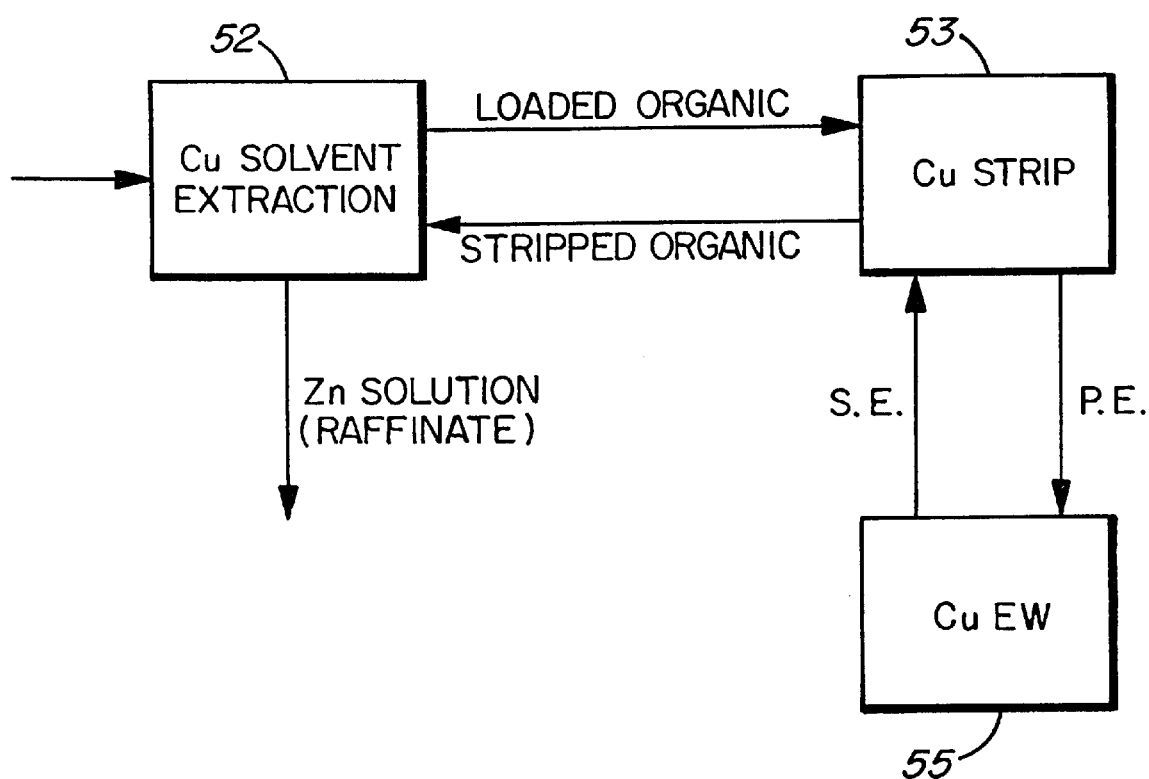
FIG. 3 is a flow diagram illustrating a copper solvent extraction which may be carried out as part of the process of FIG. 1.

The copper solvent extraction 52 produces a copper loaded extractant (organic) which is stripped as shown at 53 in FIG. 3 to produce a pregnant electrolyte from which copper is recovered by electrowinning 55. The stripping 53 is carried out with the spent electrolyte recycled from the electrowinning 55 and the stripped extractant (organic) is recycled to the copper solvent extraction 52.

The zinc pregnant solution 30 (raffinate from the copper solvent extraction 52) now containing a reduced amount of copper (e.g. 0.3 g/L) is diluted in the dilution step 50 to reduce the zinc concentration to about 15 g/L (from the original value of about 125–130 g/L).

The diluted zinc solution is then subjected to zinc solvent extraction which is carried out in at least two stages.

Zinc raffinate from the subsequent first stage zinc solvent extraction 54 is used as diluent, as indicated by arrow 56.

Zinc is extracted from the pregnant solution 30 using a suitable zinc extractant, such as diethylhexaphosphoric acid (DEHPA) in about 20% to 40% concentration in kerosene to produce a first raffinate of about 3 g/L zinc in the first stage solvent extraction 54.

The first stage solvent extraction 54 also produces a zinc loaded extractant which is stripped and subjected to electrowinning to recover zinc, as indicated at 58, similar as with copper as shown in FIG. 3.

The first raffinate from the first stage solvent extraction 54 is subjected to neutralization 60 with limestone (arrow 62) to remove free acid. The neutralization 60 produces a further gypsum residue 64 which is separated from the raffinate by a liquid/solid separation 66.

The raffinate from the liquid/solid separation 66 is split 10:1 as indicated at 68. The larger portion (90%) is the neutralized raffinate being recycled (arrow 56) referred to above.

The smaller portion (10%) is subjected to a second stage zinc solvent extraction 70, where the 3 g/L Zn concentration is reduced further to about 0.5 g/L, using the same extractant. The raffinate from the second stage solvent extraction 70 is recycled to the original waste dump leach solution, as indicated by arrow 72, to complete the cycle.

It can be seen that the above process achieves two goals simultaneously, i.e. (i) it leaches zinc from the zinc sulphide concentrate and (ii) it removes soluble iron from the copper dump leach raffinate efficiently.

Although a preferred embodiment of the present invention has been shown and described in detail, it should be understood that various changes and modifications may be made therein without departing from the scope of the appended claims.

I claim:

1. A process for the recovery of zinc from a zinc sulphide ore or concentrate, comprising the steps of:
   subjecting the ore or concentrate to pressure leaching with an acidic leach solution containing at least about 15 g/L iron in solution to produce a zinc solution and a solid leach residue containing iron;
   subjecting the zinc solution to zinc solvent extraction to produce a raffinate and a pregnant zinc solution; and
   subjecting the pregnant zinc solution to electrowinning to recover zinc and producing a resultant spent electrolyte.

2. The process according to claim 1, wherein the acidic leach solution contains at least about 30 g/L iron in solution.

3. The process according to claim 1, wherein the pressure leaching is carried out in two stages countercurrently, comprising:
- a first stage leach of the ore or concentrate to produce the zinc solution and an intermediate residue;
- a second stage leach wherein the intermediate residue is leached with said acidic leach solution containing at least about 15 g/L iron to produce said leach residue containing iron and a partly exhausted iron containing leach solution; and
- effecting the first stage leach with said partly exhausted iron containing leach solution.

4. The process according to claim 3, wherein the acidic leach solution contains at least about 30 g/L iron in solution.

5. The process according to claim 4, wherein the acidic leach solution contains from about 40 g/L to about 80 g/L iron.

6. The process according to claim 1, wherein the acidic leach solution contains about 15 g/L to about 20 g/L free acid.

7. The process according to claim 1, wherein the spent electrolyte is recycled to the zinc solvent extraction.

8. The process according to claim 1, wherein said acidic leach solution containing at least 15 g/L iron comprises an iron bearing raffinate resulting from leaching of a sulphide ore.

9. The process according to claim 8, wherein the sulphide ore comprises low grade or waste ore contained in a mining waste dump.

10. The process according to claim 1, wherein the raffinate from the zinc solvent extraction is recycled to the pressure leaching.

11. The process according to claim 1, wherein the ore or concentrate also contains copper resulting in the zinc solution from the pressure leaching also containing copper and further comprising the step of subjecting the zinc solution to copper solvent extraction prior to said zinc solvent extraction.

* * * * *